US010853758B2

(12) United States Patent
Schutt

(10) Patent No.: US 10,853,758 B2
(45) Date of Patent: Dec. 1, 2020

(54) MICRO-TAGGANT BASED AGRICULTURAL PRODUCT TRACKING SYSTEM FOR LICENSED AGRICULTURAL PRODUCTS AND INDUSTRIES

(71) Applicant: Tag-it Tech, Inc., Port Townsend, WA (US)

(72) Inventor: Paul Schutt, Port Townsend, WA (US)

(73) Assignee: TAG-IT TECH, INC., Port Townsend, WA (US)

( * ) Notice: Subject to any disclaimer, the term of this patent is extended or adjusted under 35 U.S.C. 154(b) by 401 days.

(21) Appl. No.: 15/962,424

(22) Filed: Apr. 25, 2018

(65) Prior Publication Data

US 2018/0308046 A1    Oct. 25, 2018

Related U.S. Application Data

(60) Provisional application No. 62/489,639, filed on Apr. 25, 2017.

(51) Int. Cl.
*G06Q 10/08* (2012.01)
*G06Q 50/02* (2012.01)
*C05G 5/00* (2020.01)

(52) U.S. Cl.
CPC ........... *G06Q 10/0833* (2013.01); *C05G 5/00* (2020.02); *G06Q 50/02* (2013.01)

(58) Field of Classification Search
None
See application file for complete search history.

(56) References Cited

U.S. PATENT DOCUMENTS

| 10,024,717 | B2 * | 7/2018 | Learmonth | G01J 3/28 |
| 2002/0129523 | A1 * | 9/2002 | Hunt | G09F 3/00 40/594 |
| 2006/0037222 | A1 * | 2/2006 | Hunt | G06K 19/06009 40/326 |
| 2012/0286046 | A1 * | 11/2012 | Ciurczak | B65D 23/14 235/454 |
| 2016/0069743 | A1 * | 3/2016 | McQuilkin | A22B 5/007 356/416 |

\* cited by examiner

*Primary Examiner* — Kristy A Haupt
(74) *Attorney, Agent, or Firm* — Jeffrey N. Townes; Cozen O'Connor

(57) ABSTRACT

Systems and methods for providing a micro-taggant based agricultural product tracking system enabled by micro-taggants for agricultural products and industries which identifies, tracks and/or controls a broad variety of agricultural products that are produced, distributed and sold to consumers (e.g., through the supply chain from "seed-to-sale"). Advantageously, the micro-taggant based agricultural product tracking system of the present disclosure enables all participants in one or more agricultural industries, including government regulators, law enforcement officials, producers and licensees, to benefit from vastly improved agricultural product identification and tracking capacity which ultimately results in reducing diversion of agricultural products to the black market and increasing state revenue receipts.

30 Claims, 9 Drawing Sheets

MICRO-TAGGANT BASED AGRICULTURAL PRODUCT TRACKING SYSTEM FOR LICENSED AGRICULTURAL PRODUCTS AND INDUSTRIES

PRIORITY CLAIM

This application claims priority to U.S. Provisional Patent Application No. 62/489,639 filed Apr. 25, 2017, which is incorporated herein by reference in its entirety.

FIELD OF INVENTION

The present disclosure generally relates to identification, security and tracking systems for agricultural products and industries.

BACKGROUND OF INVENTION

A rapidly growing number of government agencies and programs charged with tracking and regulating the efficient, safe and secure flow of agricultural products across state and international boundaries utilize conventional machine-readable symbol (e.g., barcode) technologies to identify, track and secure products. Typically, machine-readable symbols are physically attached to thousands of different food and beverage products and brands that are produced using thousands of different processes and located in thousands of facilities (e.g., production, processing, testing, packaging, storage, transportation, retail, etc.).

Typical barcodes, or physically attachable products suffer from numerous defects, specifically, they cannot be processed with a material, they are easy to manipulate, they are easy to forge, and they are easy to remove and replace with different physical materials, which appear to be genuine. These problems mean that they are unsuitable for use in many agricultural materials and they are certainly unsuitable for materials that may be post processed for subsequent use. Herein is described new materials and methods for tracking using micro-taggants.

SUMMARY OF INVENTION

The embodiments herein are directed to various methods for using micro-taggants and for operating micro-taggant based tracking systems. A preferred method of operating a micro-taggant based agricultural product tracking system to identify and track agricultural products may be summarized as including applying a silicon dioxide (silica) based material having an optical signature micro-taggants to each of a plurality of agricultural products, each of the micro-taggants encoding identifier information for each of the respective agricultural products; reading, via a hyper-spectral imaging taggant reader, the micro-taggants applied to at least one of the plurality of agricultural products; and tracking, via at least one processor, the identifier information for the at least one of the plurality of agricultural products based at least in part on the reading of the micro-taggants. Applying micro-taggants to each of a plurality of agricultural products may include applying micro-taggants to each of a plurality of agricultural products, the agricultural products including at least one of: alcoholic and nonalcoholic beverages, coffee, cacao, tea, cannabis, hemp, or agricultural product packaging. Applying micro-taggants to each of a plurality of agricultural products may include applying micro-taggants to each of a plurality of agricultural products, the agricultural products including at least one of a high-value crop, a derivative of a high-value crop, a government regulated crop, a derivative of a government regulated crop, or agricultural product packaging.

The method may further include receiving, via at least one processor, identifier information for the plurality of agricultural products from a plurality of hyper-spectral imaging taggant readers; and tracking, via the at least one processor, the plurality of agricultural products through a blockchain enabled enterprise system based at least in part on the received identifier information. Applying micro-taggants to each of a plurality of agricultural products may include applying micro-taggants onto or mixing micro-taggants into the plurality of agricultural products, wherein the micro-taggants may be carried by at least one of compressed air or pressurized water, Applying micro-taggants to each of a plurality of agricultural products may include applying micro-taggants onto or mixing micro-taggants into the plurality of agricultural products, wherein the micro-taggants may be mixed with and/or carried by a soluble organic agent. Applying micro-taggants to each of a plurality of agricultural products may include applying micro-taggants onto or mixing micro-taggants into crop derived products or product packaging. Applying micro-taggants to each of a plurality of agricultural products may include applying micro-taggants to each of the plurality of agricultural products multiple times throughout a vegetative growth cycle of each of the plurality of agricultural products. Applying micro-taggants to each of a plurality of agricultural products may include applying micro-taggants to each of the plurality of agricultural products multiple times during processing and packaging of the plurality of agricultural products.

Applying micro-taggants to each of a plurality of agricultural products may include dispersing the micro-taggants in water, ambient air, or other soluble organic agent; and spraying the soluble agent including the micro-taggants onto the agricultural products at least once during a vegetative growth cycle of the agricultural products.

Applying micro-taggants to each of a plurality of agricultural products may include first applying micro-taggants to each of the plurality of agricultural products prior to planting; second applying micro-taggants to each of the plurality of agricultural products when the agricultural products have reached juvenile state; and third applying micro-taggants to each of the plurality of agricultural products when the agricultural products have reached mature state. Applying micro-taggants to each of a plurality of agricultural products may include mixing the micro-taggants with at least one of a crop derivative, an oil, or a concentrate or other added value crop derived product. Applying micro-taggants to each of a plurality of agricultural products may include applying micro-taggants that may be unidentifiable to an unaided eye. Applying micro-taggants to each of a plurality of agricultural products may include applying micro-taggants to each of a plurality of agricultural products, and each of the micro-taggants encodes identifier information for each of the respective agricultural products and which identifies point of origin and related tracking information of the respective agricultural products. Applying micro-taggants to each of a plurality of agricultural products may include applying micro-taggants to each of a plurality of agricultural crops, added value products and packaging. Applying micro-taggants to each of a plurality of agricultural products may include applying micro-taggants to each of a plurality of cannabis and hemp products, and the plurality of cannabis and hemp products includes at least one of seeds, flowers, oils, concentrates, edibles, infusions, distillates, fermentations, or product packaging. Applying micro-taggants to each of a plurality of agricultural products may include applying micro-taggants to each of a plurality of agricultural products.

A micro-taggant based agricultural product tracking system designed to identify and track agricultural products may be summarized as including micro-taggants applied to each of a plurality of agricultural products, each of the micro-taggants encoding identifier information for each of the respective agricultural products; at least one hyper-spectral imaging (HSI) taggant reader that in operation reads the micro-taggants applied to at least one of the plurality of agricultural products; at least one nontransitory processor-readable storage medium that stores at least one of processor-executable instructions or data; and at least one processor communicably coupled to the at least one nontransitory processor-readable storage medium, in operation the at least one processor: may determine the identifier information for the at least one of the plurality of agricultural products based at least in part on the reading of the micro-taggants by the at least one hyper-spectral imaging (HIS) taggant reader. The agricultural products may include at least one of: alcoholic beverage, coffee, cacao, tea, cannabis, hemp or product packaging. The agricultural products may include at least one of a high-value crop, a derivative of a high-value crop, a government regulated crop, or a derivative of a government regulated crop. The at least one processor may receive identifier information for the plurality of agricultural products from a plurality of hyper-spectral imaging (HSI) taggant readers; and track the plurality of agricultural products through a micro-taggant based agricultural product tracking system based at least in part on the received identifier information. The micro-taggants are unidentifiable to an unaided eye. Each of the micro-taggants may encode identifier information for each of the respective agricultural products which identifies tracking information of the respective agricultural products. The plurality of agricultural products may include at least one of seeds, flowers, oils, concentrates, edibles, infusions, distillates, fermentations, or product packaging. The micro-taggants are constructed of inert silica that does not react with compounds when mixed with oils, concentrates, solvents, dilutions, dispersions and suspensions. In certain systems the micro-taggant is generally recognized as safe for consumption. In further systems, the micro-taggant can be utilized as a fertilizer when applied to the agricultural product.

A preferred embodiment is directed towards a method of operating a micro-taggant based agricultural product tracking system to identify agricultural products, the method comprising: applying a silicon dioxide (silica) material encoded with an optical signature (micro-taggants) to each of a plurality of agricultural products, each of the micro-taggants encoding identifier information for each of the respective agricultural products; reading, via a hyper-spectral imaging (HSI) taggant reader, the micro-taggants applied to at least one of the plurality of agricultural products; and determining, via at least one processor, the identifier information for the at least one of the plurality of agricultural products based at least in part on the reading of the micro-taggants. The method, wherein applying micro-taggants to each of a plurality of agricultural products comprises applying micro-taggants to each of a plurality of agricultural products, the agricultural products comprising at least one of: cannabis, alcohol, coffee, cacao, tea, or product packaging. The method, wherein applying micro-taggants to each of a plurality of agricultural products comprises applying micro-taggants to each of a plurality of agricultural products, the agricultural products comprising at least one of a high-value crop, a derivative of a high-value crop, a government regulated crop, a derivative of a government regulated crop, or product packaging.

In preferred embodiments, the methods further comprising: receiving, via at least one processor, identifier information for the plurality of agricultural products from a plurality of hyper-spectral imaging (HSI) taggant readers; and tracking, via the at least one processor, the plurality of agricultural products through a supply chain based at least in part on the received identifier information. The method, wherein applying micro-taggants to each of a plurality of agricultural products comprises applying micro-taggants onto or mixing micro-taggants into the plurality of agricultural products, wherein the micro-taggants are carried by at least one of compressed ambient air or pressurized potable water. The method wherein applying micro-taggants to each of a plurality of agricultural products comprises applying micro-taggants onto or mixing micro-taggants into the plurality of agricultural products, wherein the micro-taggants are carried by a soluble organic agent. The method, wherein applying micro-taggants to each of a plurality of agricultural products comprises applying micro-taggants onto or mixing micro-taggants into crop derived products or product packaging.

In preferred embodiments, the methods comprises wherein applying micro-taggants to each of a plurality of agricultural products comprises applying micro-taggants to each of the plurality of agricultural products multiple times throughout a vegetative growth cycle of each of the plurality of agricultural products. The method, wherein applying micro-taggants to each of a plurality of agricultural products comprises applying micro-taggants to each of the plurality of agricultural products during processing of the plurality of agricultural products. The method, wherein applying micro-taggants to each of a plurality of agricultural products comprises: dispersing the micro-taggants in a soluble organic agent; and spraying the soluble agent including the micro-taggants onto the agricultural products at least once during a vegetative growth cycle of the agricultural products. The method, wherein applying micro-taggants to each of a plurality of agricultural products comprises: first applying micro-taggants to each of the plurality of agricultural products prior to planting; second applying micro-taggants to each of the plurality of agricultural products when the agricultural products have reached juvenile state; and third applying micro-taggants to each of the plurality of agricultural products when the agricultural products have reached mature state.

In preferred embodiments, the method wherein applying micro-taggants to each of a plurality of agricultural products comprises mixing the micro-taggants with at least one of an oil, a crop derivative, concentrate, edible, beverage or other added value agricultural product. The method, wherein applying micro-taggants to each of a plurality of agricultural products comprising applying micro-taggants that are unidentifiable to an unaided eye. The method, wherein applying micro-taggants to each of a plurality of agricultural products comprises applying micro-taggants to each of a plurality of agricultural products, and each of the micro-taggants encodes identifier information for each of the respective agricultural products which identifies tracking information of the respective agricultural products. The method, wherein applying micro-taggants to each of a plurality of agricultural products comprises applying micro-taggants to each of a plurality of cannabis products, and the plurality of cannabis products comprises at least one of seeds, flowers, oils, concentrates, edibles, infusions, distillates, fermentations, or product packaging. Preferably, the micro-taggants are constructed of materials that do not burn, oxidize or otherwise degrade upon combustion. Preferably, the micro-taggants are constructed of non-toxic and inert materials that do not react with agricultural compounds when mixed with oils, concentrates, solvents, dilutions, dispersions and suspensions.

In further embodiments, a security system to identify agricultural products, the security system comprising: a plurality of micro-taggants applied to each of a plurality of agricultural products, each of the micro-taggants encoding identifier information for each of the respective agricultural products; at least one hyper-spectral imaging (HSI) taggant reader operable for reading the micro-taggants applied to the at least one of the plurality of agricultural products; at least one nontransitory processor-readable storage medium that stores at least one of processor-executable instructions or data; and at least one processor communicably coupled to the at least one nontransitory processor-readable storage medium, in operation the at least one processor: determines the identifier information for the at least one of the plurality of agricultural products based at least in part on the reading of the micro-taggants by the at least one hyper-spectral imaging (HSI) taggant reader. In certain embodiments, the micro-taggant based agricultural product tracking system further comprising a plurality of a second micro-taggants, said second micro-taggants having a different identifier information than the first micro-taggant. In certain embodiments, wherein the micro-taggants and the second micro-taggants each have different access controls enabled for viewing or tracking the status of the agricultural product.

In certain embodiments, a micro-taggant based agricultural product tracking system wherein the at least one processor: receives identifier information for the plurality of agricultural products from a plurality of hyper-spectral imaging (HSI) taggant readers; and tracks the plurality of agricultural products through a supply chain based at least in part on the received identifier information. In certain systems, wherein the micro-taggants are unidentifiable to an unaided eye, or wherein each of the micro-taggants encodes identifier information for each of the respective agricultural products which identifies tracking information of the respective agricultural products. In certain embodiments, the micro-taggant based agricultural product tracking system of claim 18 wherein the plurality of agricultural products comprises at least one of seeds, flowers, oils, concentrates, edibles, infusions, distillates, fermentations, or product packaging.

In all embodiments, it is preferable that the micro-taggant is generally recognized as safe for consumption.

In certain embodiments, the micro-taggant can be utilized as a fertilizer when applied to the agricultural product.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION OF THE EMBODIMENTS

Figure 1:
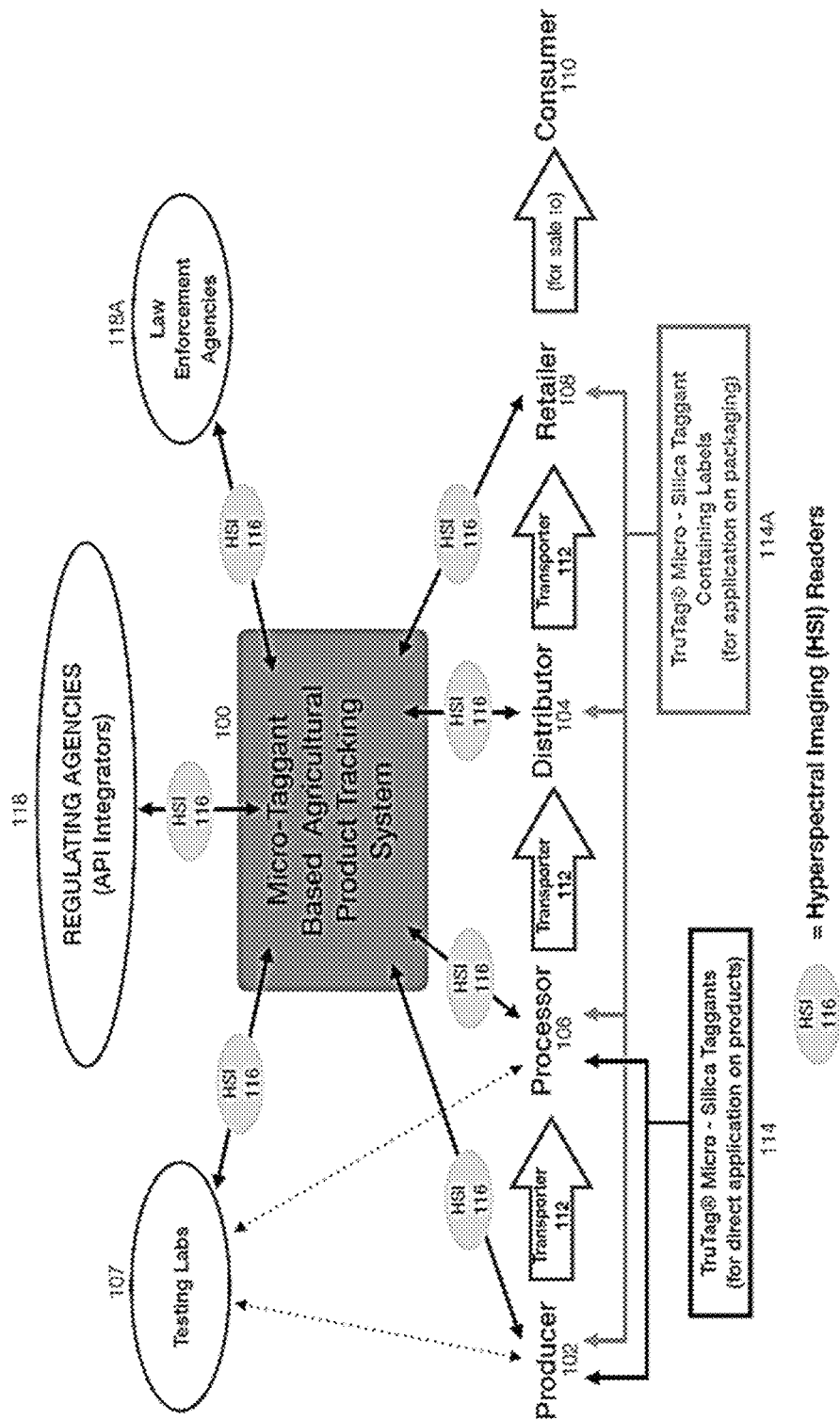
FIG. 1 is a schematic block diagram of a micro-taggant based agricultural product tracking system that identifies, and tracks, agricultural products throughout a supply chain, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

The Applicant of the present disclosure has identified limitations and shortfalls of machine-readable symbol-based (barcode based) tracking systems currently used in the supply chains for agricultural products. These limitations and shortfalls stem from at least two facts. First, machine-readable symbols (e.g., bar codes) are easy to detect with the naked eye, which allows individuals to know that the product is trackable. Second, machine-readable symbols can be easily separated from the products they are meant to identify, track and secure. These fundamental limitations enable a broad variety of product tampering, counterfeiting, theft and hijacking activities that negatively impact legitimate public revenue generation as well as revenues generated by private state licensed companies.

One or more implementations of the present disclosure address some or all of the aforementioned limitations of existing systems by providing a micro-taggant based agricultural product tracking system which identifies, tracks and/or secures a broad variety of agricultural related products that are produced, distributed and sold to consumers (e.g., through the supply chain from "seed-to-sale"). One example of a suitable micro-taggant is sold under the brand name TruTag® micro-taggant technologies. TruTag® is covered by several granted and pending US patents, including: U.S. Pat. Nos. 8,596,546; 8,991,697; 9,430,771; 8,881,972; 9,033,213, 8,453,929; 8,511,557; 8,596,546; 8,636,213; 8,833,656; 8,881,972; 8,991,697; 9,033,213; 9,251,452; 9,430,771; 9,501,670; 9,523,634; 9,677,935; 9,798,903; 9,799,541; and 9,927,299.

At least some implementations of the micro-taggant based agricultural product tracking system disclosed herein vastly improves upon security technologies currently being utilized for identifying agricultural products. The micro-taggant based agricultural product tracking system disclosed herein services a critical need for improved identification and tracking measures for agricultural products and industries operating in domestic and/or foreign markets. Non-limiting examples of agricultural products include cannabis, alcoholic beverages (e.g., beer, wine, cider, and liquor), coffee, cacao, tea, product packaging for such, etc.

Advantageously, the micro-taggant based agricultural product tracking system of the present disclosure enable all participants in an agricultural product industry, including government regulators, law enforcement officials, producers and licensees, to benefit from vastly improved product identification capacity which ultimately result in improved agricultural product identification, tracking and inventory control. The security systems make it much easier for law enforcement agencies to regulate licensed industry participants and to prosecute black market participants. The micro-taggant based agricultural product tracking system disclosed herein does not rely on machine-readable symbol (e.g., barcode) technology. Rather, the system relies on applying inert inactive microscopic particles bearing coded information generally referred to herein as "micro-taggants" or "taggants" to the surface of agricultural products. Advantageously, the inactive microscopic particles added to agricultural products are imperceptible to the unaided eye and provide novel and non-obvious ways of covertly identifying, tracking and controlling agricultural products that machine-readable symbol technologies (barcodes) are incapable of providing.

First, the system disclosed herein is many orders of magnitude more difficult to tamper with than machine-readable symbols. The covert and inactive microscopic particles are imperceptible to the unaided eye ("invisible") and extremely difficult to detect in agricultural products without properly trained personnel using highly specialized and proprietary hyper-spectral imaging (HSI) readers, referred to herein as "HSI." Second, unlike machine-readable symbol technology based systems (e.g. barcodes), micro-taggants are virtually impossible, to physically separate from the agricultural products which they identify, track and control.

Third, unlike machine-readable symbol technology based systems (e.g. bar codes), micro-taggants are virtually impossible, to counterfeit or copy.

Fourth, the micro-taggant based agricultural product tracking system described the present disclosure is much simpler and more efficient to apply and use compared to machine-readable symbol technology based systems.

Some of the problems facing production, processing, distribution and sale of agricultural products (e.g., government licensed cannabis programs and related industries) are discussed below along with the corresponding solutions provided by the systems and methods disclosed herein.

A first issue relates to product diversion and black marketing. Agricultural product diversion and black-marketing remains a persistent and pervasive problem. In the context of cannabis products, for example, the diversion problem has been only minimally reduced by so-called "seed-to-sale" machine-readable symbol based product identification security systems, but the problem still largely persists; negatively impacting state revenue receipts.

One or more implementations of the present disclosure include applying (e.g., spraying) micro-taggants that have been coded for individual licensees that have been dispersed in water or air directly on to seeds, plants and/or flowers, or other components of agricultural products (e.g., processed products such a concentrates, edibles, beverages and product packaging). In at least some implementations, the application may be applied multiple times during the vegetative growth cycle. For example, in a cannabis products application, a spray may be applied at least three times during the cannabis vegetative growth cycle: a first application prior to planting, a second application when the plants have reached approximately one half their vegetative size, and a third application when the plants have fully matured and flowered before harvest. This application process is provided as an example and should not be considered limiting.

A second implementation relates to modified or processed agricultural products, such as concentrates, edibles and beverages. Continuing with the cannabis products example, a growing number of concentrate, edible and beverage related diversion problems plague the government licensed cannabis industry. These problems cannot be solved using conventional barcode technologies. For example, concentrates and edibles may be produced using a variety of cannabis feedstock types (e.g., whole flowers, flower trim, concentrates, recycled by products) originating from a single producer or variety of producers. These concentrates and edibles may contain highly variable concentrations of active cannabis compounds. Utilizing the implementations discussed herein, such concentrates and edibles may be mixed with and/or coated by micro-taggant identification particles that have been coded for individual licensees and are applied at each step in the cannabis product production process.

Other issues relate to unauthorized production, product counterfeiting and/or product substitution. Agricultural products may be produced, marketed and sold using brand names that retailers and consumers recognize and prefer. Not surprisingly, successful brands are being produced without authorization, counterfeited and/or substituted by illicit operators. Machine-readable symbol technologies are proving largely incapable of controlling those kinds of activities. By applying micro-taggant identification particles to branded products and/or their branded packaging, such unauthorized production, product counterfeiting and/or product substitution can be reduced or eliminated.

In at least some implementations, a micro-taggant based agricultural product tracking system is provided in which one or more suitable micro-taggants may be applied to agricultural products as physical-chemical identifiers (PC-IDs), and hyper-spectral imaging (HSI) reader hardware and software ("taggant readers") may be provided for use by various entities of the supply chain for use in tracking agricultural products. Non-limiting examples of agricultural products include cannabis, alcohol (e.g., beer, wine, cider, and liquor), coffee, cacao, tea, product packaging, etc. Cannabis products may include, but are not limited to, cannabis seeds, leaves, stems, flowers, flower trim, oils, concentrates, edibles, infusions, etc.

The micro-taggants are silicon dioxide (silica) materials, encoded with an optical signature and are classified by the U.S. Food and Drug Administration as "Generally Recognized as Safe" (GRAS) components and are currently used to identify products produced by the pharmaceutical and nutraceutical industries. These tags are made of the same inert silica that organic horticulturalists apply to plants and soil to grow healthy, robust and disease free plants. These silica tags are secure and edible, and can be admixed into a number of carriers for adding to a product. The small particle sized silica attaches to the product and comprises a custom-manufactured spectral signature, providing for millions of possibilities for unique signatures. A HSI can then be utilized to identify the specific and unique signature to confirm the identity of the tag. Because of the unique signature, the methods and systems described herein, can scan this unique tag and utilize it to manage the flow of products, just as if a manual bar code or other visible tag were utilized.

The tags are further advantageous as there are millions of unique codes available, they require no energy input or output to function, are inconspicuous (sized from about 50 to 100 micrometers), which allows for discrete tagging or even covert/semi-covert tagging. Finally, they are highly durable and resistant to temperature extremes, and thus they are generally safe to use, should the tagged product be placed in typical cooking and post processing systems. Scanning of the tags simply requires the use of an optical hyper-spectral imaging reader, which can identify the tag and upload the tag to a database, wherein information can be added or annotated, as with any other tagged product. Finally, these readers do not require you to find a bar code, or risk the loss or breakage of a barcode or manual code. A simple area scan of the product will find the tag and quickly confirm the unique code.

In at least some implementations, micro-taggants may be attached to plant materials (e.g., seeds, vegetation and flowers) by spraying plant materials with micro-taggants that are carried by compressed ambient air or pressurized potable water. In at least some implementations, one or more organic dispersal agents may be specified to aid in mixing and spraying dilutions of taggants on to plant materials with ambient air or potable water carriers, for example. Micro-taggants may additionally or alternatively be mixed directly with oils or concentrates used in the preparation of infused edibles and/or applied directly to surface of infused edibles. In at least some implementations, one or more organic dispersal agents may be provided to aid in mixing the micro-taggants into edible products.

The security system may utilize existing hyper-spectral imaging (HSI) taggant reading hardware and software and/or may utilizes modified or new hyper-spectral imaging (HSI) taggant reading hardware and software to meet the specific security needs of government agency personnel charged with identifying, tracking and recording agricultural products while regulating production, processing, packaging, distribution, sales, etc.

FIG. 1 shows a schematic block diagram of a micro-taggant based agricultural product tracking system. The example provided in FIG. 1 may particularly apply to cannabis products supply chains, but may also apply to supply chains for various other agricultural products, which may be identical, similar, or different from the supply chain. Further, the supply chain 100 is provided for illustrative purposes and should not be considered as a limiting example of a particular agricultural industry or supply chain. For example, supply chains may include additional, fewer or different entities than those depicted in FIG. 1.

In the example of FIG. 1, producers 102 may have agricultural products tested by a licensed testing lab 107 for quality assurance before transporting it to a distributor 104. Similarly, processors 106 may receive stock from producers 102 and may send manufactured agricultural products to a licensed testing lab 107 before transporting it to a distributor. The licensed testing lab may test the agricultural products for concentration, purity, contaminants, etc. Movement of the agricultural products between the producers 102, processors 106, distributers 104 and retailers 108 may be performed by one or more licensed transporters 112, for example. The entire agricultural product supply chain may be monitored, inspected, and/or controlled by one or more regulating agencies 118 and law enforcement agencies 118A.

According to at least some of the implementations of the present disclosure, a micro-taggant application process 114 may be implemented by the producers 102 and/or the processors 106 to apply micro-taggants directly to agricultural products. The applied micro-taggants may encode identifier information which uniquely identifies one or more characteristics of the agricultural products, such as the producer, processor, licensee, strain, a production date, etc.

One or more of the producers 102, processors 106, distributors 104, retailers 108, transporters 112, testing labs 107, regulating agencies 118 and law enforcement agencies 118A may be equipped with hyper-spectral imaging (HSI) taggant readers 116 which are able to "read" the information encoded by the taggants applied to the agricultural products during the micro-taggant application process 114 so that the one or more characteristics of the agricultural products may be identified. Such feature allows agricultural products to be tracked by the micro-taggant based agricultural product tracking system 100 from the producer 102 through sale of agricultural products to consumers 110. The hyper-spectral imaging (HSI) taggant readers 116 may be communicatively coupled to a micro-taggant based agricultural product tracking system 100 that tracks agricultural products through the various channels from the producers 102 to the consumers 110.

The particular technology used in the hyper-spectral imaging (HSI) taggant readers 116 may be dependent on the type of micro-taggants applied to the agricultural products and/or their packaging.

Generally, the hyper-spectral imaging (HSI) taggant readers 116 may be any suitable hardware and/or software capable of detecting micro-taggants applied to agricultural products and/or packaging for agricultural products. The taggant readers 116 may be portable (e.g., handheld readers) or stationary (e.g., fixed readers).

Figure 2:
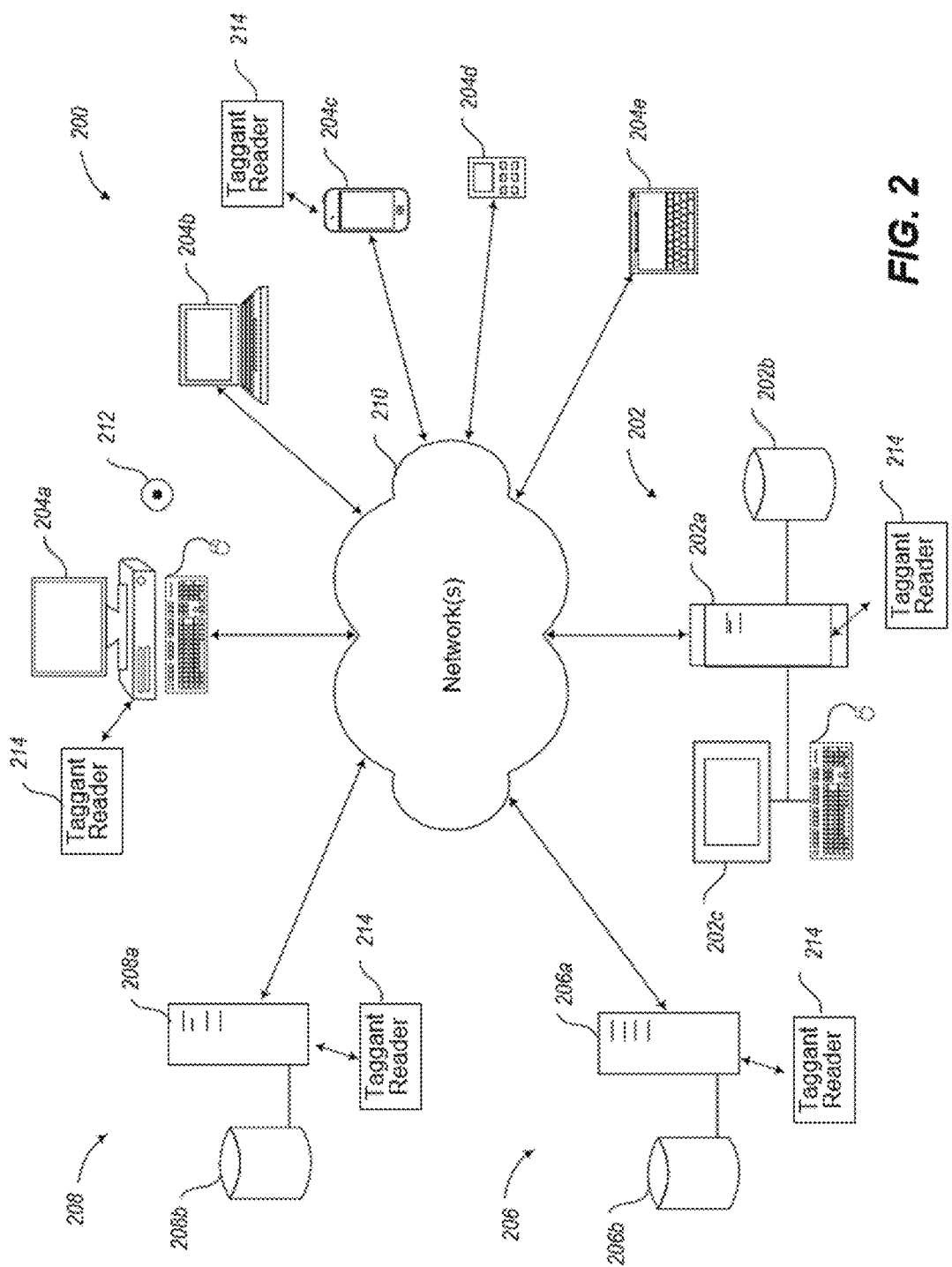
FIG. 2 is a schematic diagram of a networked environment in which a micro-taggant based agricultural product tracking system may be implemented, according to one illustrated implementation.

FIG. 2 shows a network environment 200 in which various implementations of the presently described apparatus, methods and articles can reside, according to one illustrated implementation. The environment 200 may facilitate provision of a micro-taggant based agricultural product tracking system that includes interfaces for regulating agencies, licensees, law enforcement agencies, consumers, and/or other entities associated with an agricultural products industry (e.g., the regulated cannabis industry).

The network environment 200 includes one or more computing systems 202 that facilitates the identification, tracking and/or "seed-to-sale" control of agricultural products. As an example, the computing system 202 may include suitable interfaces and a database that stores information (e.g., micro-taggant information, licensee information, transaction information, product location information, timestamp information) relating to agricultural products. The computing system(s) 202 may support an applications programming interface (API), Web portal, Website or Enterprise System supporting the micro-taggant based agricultural product tracking system and provide services accessible by users associated with various entities such as regulating agencies, licensees, law enforcement agencies, consumers, and/or other entities associated with an agricultural products industry (collectively 204), for example.

The network environment 200 may also include one or more enforcement and/or regulatory computing systems 206, which allows regulating agencies to monitor and track all product locations and transactions within the micro-taggant based agricultural product tracking system. The regulatory computing system 206 may communicate with the micro-taggant based agricultural product tracking system computing system 202 to send and receive data relating to agricultural products, licensees, consumers, etc. Regulating agencies may utilize the regulatory computing system 202 to track agricultural products, generate reports, receive alerts, determine the validity of transactions, view trends, etc.

The network environment 200 may also include one or more licensee computing systems 208 (only one shown), which may allow licensees (e.g., producers, processors, distributors, testers, transporters) to view all their agricultural product locations, transactions, status information, etc. Such allows licensees to track and/or audit their inventory in real-time, for example. The licensee computing systems 208 may interface with the computing system 202 to update, modify and/or delete agricultural products or transactions from the system. In at least some implementations, the systems 204, 206 and 208 may be similar physical devices but their functionality may be selectively controlled by the computing system 202 dependent on access privileges (e.g., a distributor may be provided with different functionality than a retailer, a regulating agency may be provided with different functionality than a producer, etc.).

The environment 200 also includes a plurality of micro-taggant readers 214 communicatively coupled to one or more computing systems, such as the systems 202, 204, 206, or 208. The micro-taggant readers 214 may be operated by various entities associated with one or more agricultural products or agricultural industries. As discussed above, the taggant readers 214 may be any suitable hyper-spectral imaging (HSI) taggant reader, scanner or detector capable of detecting micro-taggants applied to agricultural products or packaging for agricultural products. In at least some implementations, when a hyper-spectral imaging (HSI) taggant reader 214 reads micro-taggants one or more of the systems 202, 204, 206, 208 may be updated to track the agricultural product or packaging to which the micro-taggants taggants were applied. The tracking data may be sent from time-to-time (e.g., periodically, real-time) to the computing system 202 for storage and access by one or more entities (e.g., regulating agencies, licensees).

One or more communications infrastructures, represented by networks 210, provide communications between the computing system(s) 202, regulating agency devices 204, and between the computing system(s) 202 and the systems 206 and 208.

The one or more communications networks 210 may take a variety of forms. For instance, the communications networks 210 may include wired, wireless, optical, or a combination of wired, wireless and/or optical communications links. The one or more communications networks 210 may include public networks, private networks, unsecured networks, secured networks or combinations thereof. The one or more communications networks 210 may employ any one or more communications protocols, for example, TCP/IP protocol, UDP protocols, IEEE 802.11 protocol, as well as other telecommunications or computer networking protocols. The one or more communications networks 210 may include what are traditionally referred to as computing networks and/or what are traditionally referred to as telecommunication networks or combinations thereof. In at least one implementation, the one or more communications networks 210 includes the Internet, and in particular, the Worldwide Web or (referred to herein as "the Web").

Consequently, in at least one implementation, one or more of the computing system(s) 202 execute server software to serve HTML source files or Web pages and/or Web services, and the one or more systems 204, 206 and 208 execute browser software to request and display HTML source files or Web pages. Notably, the network 210 does not form part of any claimed environment or system, and is typically supplied by a third party entity, for example, a telecommunications company, Internet service provider (ISP) or other entity.

The retailer computing systems 204 can take any of a large variety of forms, a few of which are illustrated in FIG. 2. The retailer computing systems 204 can, for example, take the form of one or more computers or computing systems, such as desktop or personal computers (PCs) 204a or laptop or netbook computers 204b, with non-transitory computer-readable media 212. The retailer computing systems 204 can, for example, take the form of one or more mobile or telecommunications devices, for instance Internet or Web enabled cellular or "smart" phones 204c (only one illustrated), or personal digital assistant (PDA) devices 204d (only one illustrated) or tablet computers 204e. The retailer computing systems 204 may also take the form of any of the other computing systems 202, 206 and 208, for example. The retailer computing systems 204 can store and execute a set of browser instructions or programs. The retailer computing systems 204 can be communicatively coupled to the network 210 via wired, wireless or a combination of wired and wireless communications channels.

The licensee computing system(s) 208 can take a large variety of forms. The licensee computing system(s) 208 can, for example, take the form of one or more mainframe computer systems, mini-computer systems, workstation computer systems, personal computer systems, and/or server computer systems. The licensee computing systems 208 may also take the form of any of the other computing systems 202, 204 and 206, for example. The vendor computing system(s) 208 can, for example, include a computer system 208a with one or more processors (i.e., hardware circuitry) and nontransitory computer- or processor-readable media 208b that stores at least one of processor-executable instructions and/or data. For example, the licensee computing system(s) 208 can include one or more processors that execute server instructions (i.e., server software) stored on the computer-readable media 208b to provide server functions in the network environment 200. For instance, the licensee computing system(s) 208 can serve files related to items sold or distributed by the licensee, which files are stored in one or more databases, or other computer-readable storage media 208b (e.g. authenticating blockchain ledgers).

The regulatory computing system(s) 206 can take a large variety of forms. The regulatory computing system(s) 206 can, for example, take the form of one or more mainframe computer systems, mini-computer systems, workstation computer systems, personal computer systems, and/or server computer systems. The regulatory computing systems 206 may also take the form of any of the other computing systems 202, 204 and 208, for example. The regulatory computing system(s) 206 can, for example, include a computer system 206a with one or more processors (i.e., hardware circuitry) and nontransitory computer- or processor-readable media 206b that stores at least one of processor-executable instructions and/or data. For example, the regulatory computing system(s) 206 can include one or more processors that execute server instructions (i.e., server software) stored on the computer-readable media and/or authenticating blockchain ledgers 206b to provide ecommerce server functions in the network environment 200.

The computing system(s) 202 may include one or more systems 202a, nontransitory computer- or processor-readable media 202b that stores at least one of processor-executable instructions or data (e.g., files, HTML, CSS,) user information, product information, shipment information, tracking history), and optionally one or more control terminals 202c. The one or more control terminals 202c may provide a user interface to interact with and control operation of the one or more computing system(s) 202 and/or nontransitory computer- or processor-readable media 20 computing system(s) 202 execute instructions stored on computer-readable media 202b that cause the ag system computing system(s) 202 to provide a system that identifies, tracks and/or secures agricultural products through the supply chain, as described herein.

One or more nontransitory media 202b can store information used to identify, track and secure individual agricultural products, for example, in one or more databases, data stores, blockchains or other data structures. The nontransitory media 202b can store information used to logically associate each of the agricultural products to one or more transactions or events, such as growing events, shipping events, testing events, sales events, etc.

Figure 3:
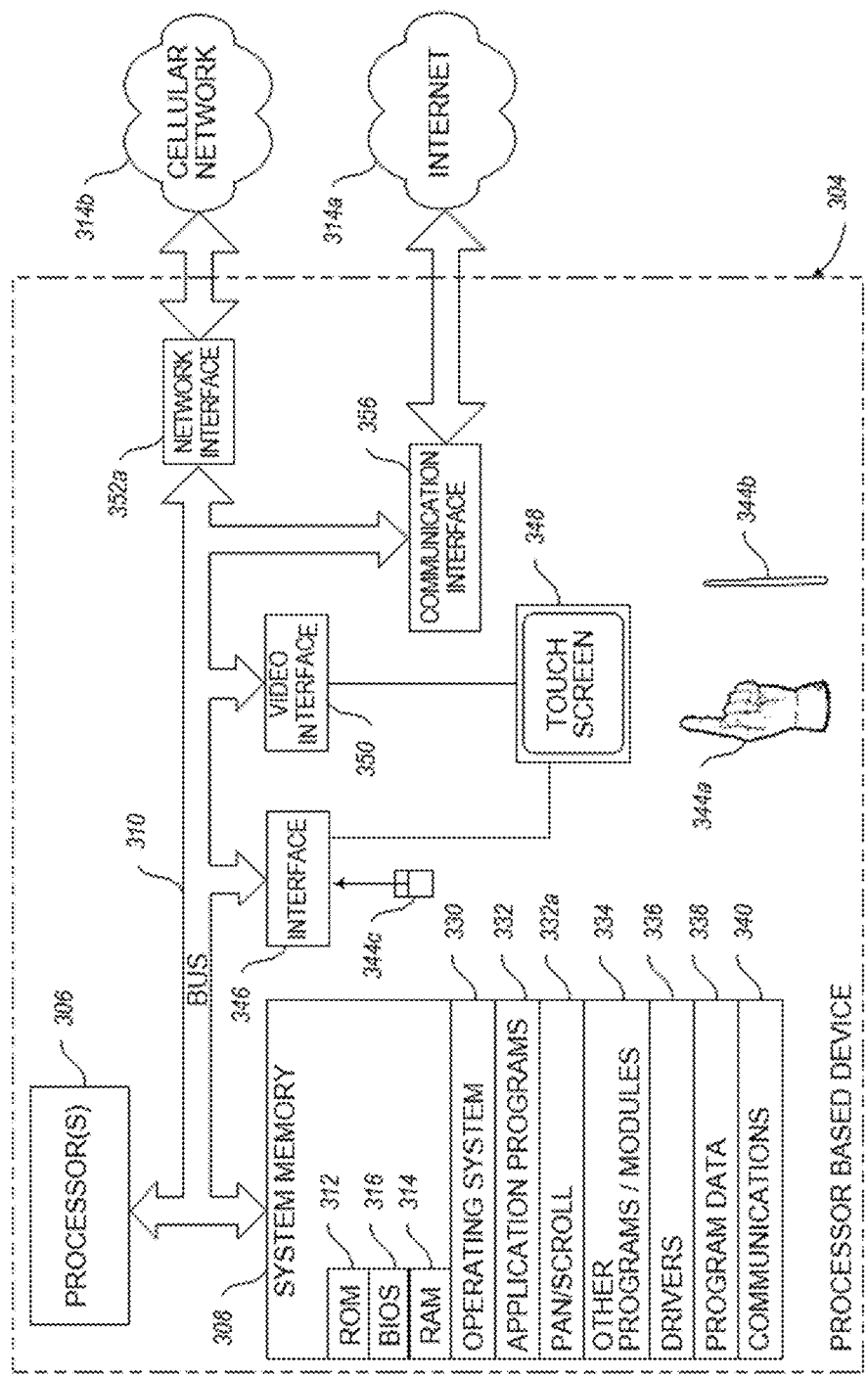
FIG. 3 is a block diagram of an example processor-based device used to implement one or more of the computing systems of a micro-taggant based agricultural product tracking system according to one illustrated implementation.

FIG. 3 shows a processor-based device 304 suitable for implementing various implementations described herein.

The processor-based device 304 may be representative of any of the systems 202, 204, 206 and 208 of the environment 200 of FIG. 2, for example. Although not required, some portion of the implementations will be described in the general context of processor-executable instructions or logic, such as program application modules, objects, or macros being executed by one or more processors. Those skilled in the relevant art will appreciate that the described implementations, as well as other implementations, can be practiced with various processor-based system configurations, including handheld devices, such as smartphones and tablet computers, wearable devices, multiprocessor systems, microprocessor-based or programmable consumer electronics, personal computers ("PCs"), network PCs, minicomputers, mainframe computers, and the like.

The processor-based device 304 may, for example, take the form of a smartphone or tablet computer, which includes one or more processors 306, a system memory 308 and a system bus 310 that couples various system components including the system memory 308 to the processor(s) 306. The processor-based device 304 will at times be referred to in the singular herein, but this is not intended to limit the implementations to a single system, since in certain implementations, there will be more than one system or other networked computing device involved. Non-limiting examples of commercially available systems include, but are not limited to, ARM processors from a variety of manufactures, Core microprocessors from Intel Corporation, U.S.A., PowerPC microprocessor from IBM, Sparc microprocessors from Sun Microsystems, Inc., PA-RISC series microprocessors from Hewlett-Packard Company, 68xxx series microprocessors from Motorola Corporation.

The processor(s) 306 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 3 are of conventional design. As a result, such blocks need not be described in further detail herein, as they will be understood by those skilled in the relevant art.

The system bus 310 can employ any known bus structures or architectures, including a memory bus with memory controller, a peripheral bus, and a local bus. The system memory 308 includes read-only memory ("ROM") 312 and random access memory ("RAM") 314. A basic input/output system ("BIOS") 316, which can form part of the ROM 312, contains basic routines that help transfer information between elements within processor-based device 304, such as during start-up. Some implementations may employ separate buses for data, instructions and power.

The processor-based device 304 may also include one or more solid state memories, for instance Flash memory or solid state drive (SSD), which provides nonvolatile storage of computer-readable instructions, data structures, program modules and other data for the processor-based device 304. Although not depicted, the processor-based device 304 can employ other nontransitory computer- or processor-readable media, for example a hard disk drive, an optical disk drive, or memory card media drive.

Program modules can be stored in the system memory 308, such as an operating system 330, one or more application programs 332, other programs or modules 334, drivers 336 and program data 338.

The application programs 332 may, for example, include panning/scrolling 332a. Such panning/scrolling logic may include, but is not limited to logic that determines when and/or where a pointer (e.g., finger, stylus, cursor) enters a user interface element that includes a region having a central portion and at least one margin. Such panning/scrolling logic may include, but is not limited to logic that determines a direction and a rate at which at least one element of the user interface element should appear to move, and causes updating of a display to cause the at least one element to appear to move in the determined direction at the determined rate. The panning/scrolling logic 332a may, for example, be stored as one or more executable instructions. The panning/scrolling logic 332a may include processor and/or machine executable logic or instructions to generate user interface objects using data that characterizes movement of a pointer, for example data from a touch-sensitive display or from a computer mouse or trackball, or other user interface device.

The system memory 308 may also include communications programs 340, for example a server and/or a Web client or browser for permitting the processor-based device 304 to access and exchange data with other systems such as user computing systems, Web sites on the Internet, corporate intranets, or other networks as described below. The communications program 340 in the depicted implementation is markup language based, such as Hypertext Markup Language (HTML), Extensible Markup Language (XML) or Wireless Markup Language (WML), and operates with markup languages that use syntactically delimited characters added to the data of a document to represent the structure of the document. A number of servers and/or Web clients or browsers are commercially available such as those from Mozilla Corporation of California and Microsoft of Washington.

While shown in FIG. 3 as being stored in the system memory 308, the operating system 330, application programs 332, other programs/modules 334, drivers 336, program data 338 and server and/or browser 340 can be stored on any other of a large variety of nontransitory processor-readable media (e.g., hard disk drive, optical disk drive, SSD and/or flash memory.

A user can enter commands and information via a pointer, for example through input devices such as a touch screen 348 via a finger 344a, stylus 344b, or via a computer mouse or trackball 344c which controls a cursor. Other input devices can include a microphone, joystick, game pad, tablet, scanner, biometric scanning device, etc. These and other input devices (i.e., "I/O devices") are connected to the processor(s) 306 through an interface 346 such as a touch-screen controller and/or a universal serial bus ("USB") interface that couples user input to the system bus 310, although other interfaces such as a parallel port, a game port or a wireless interface or a serial port may be used. The touch screen 348 can be coupled to the system bus 310 via a video interface 350, such as a video adapter to receive image data or image information for display via the touch screen 348. Although not shown, the processor-based device 304 can include other output devices, such as speakers, vibrator, haptic actuator or haptic engine, etc.

The processor-based device 104 operates in a networked environment using one or more of the logical connections to communicate with one or more remote computers, servers and/or devices via one or more communications channels, for example, one or more networks 314a, and 314b. These logical connections may facilitate any known method of permitting computers to communicate, such as through one or more LANs and/or WANs, such as the Internet, and/or cellular communications networks. Such networking environments are well known in wired and wireless enterprise-wide computer networks, intranets, extranets, the Internet, and other types of communication networks including telecommunications networks, cellular networks, paging networks, and other mobile networks.

When used in a networking environment, the processor-based device 304 may include one or more network, wired or wireless communications interfaces 352a, 356 (e.g., network interface controllers, cellular radios, WI-FI radios, Bluetooth radios) for establishing communications over the network, for instance the Internet 314a or cellular network.

In a networked environment, program modules, application programs, or data, or portions thereof, can be stored in a server computing system (not shown). Those skilled in the relevant art will recognize that the network connections shown in FIG. 3 are only some examples of ways of establishing communications between computers, and other connections may be used, including wirelessly.

For convenience, the processor(s) 306, system memory 308, and network and communications interfaces 352a, 356 are illustrated as communicably coupled to each other via the system bus 310, thereby providing connectivity between the above-described components. In alternative implementations of the processor-based device 304, the above-described components may be communicably coupled in a different manner than illustrated in FIG. 3. For example, one or more of the above-described components may be directly coupled to other components, or may be coupled to each other, via intermediary components (not shown). In some implementations, system bus 310 is omitted and the components are coupled directly to each other using suitable connections.

Figure 4:
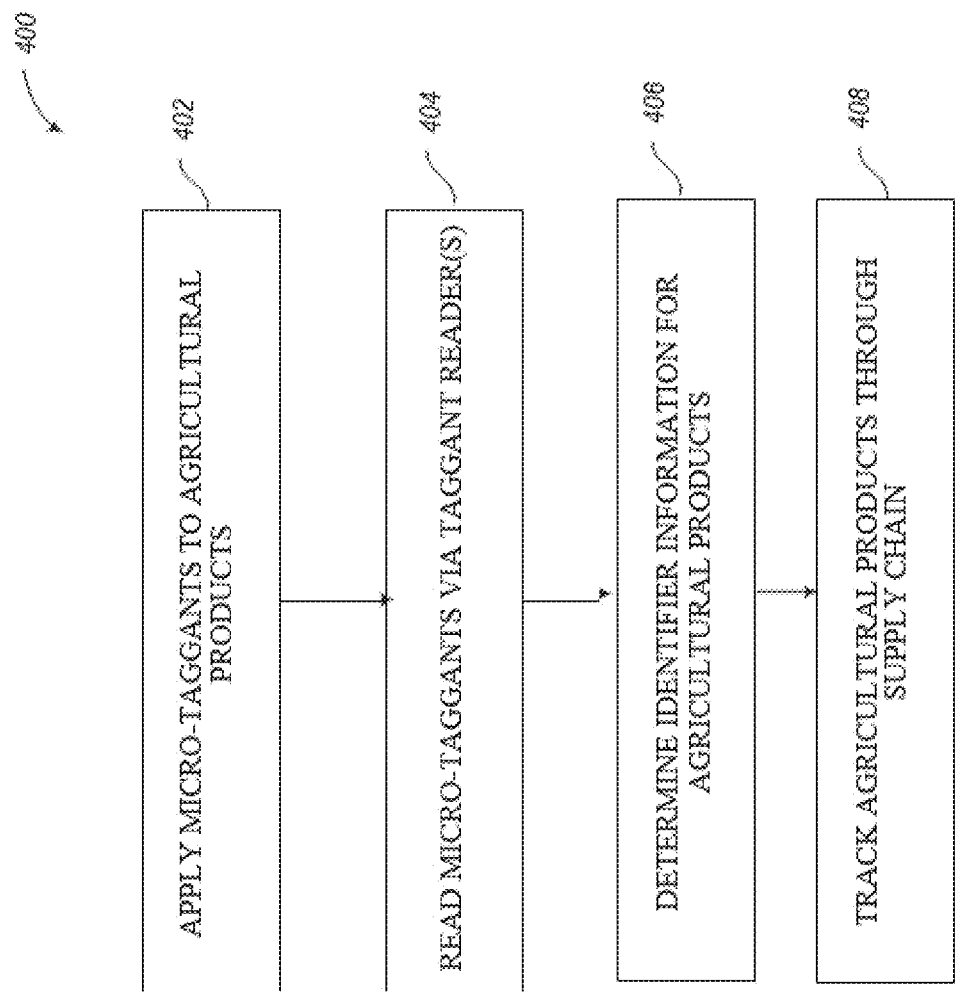
FIG. 4 is a flow diagram for a method of operating a micro-taggant based agricultural product tracking system to identify, track, and/or secure agricultural products, according to one illustrated implementation.

FIG. 4 shows a flow diagram for a method 400 of operating a micro-taggant based agricultural product tracking system designed to identify, track and/or control agricultural products. The method 400 may be implemented by one or more of the computing systems discussed herein, for example.

At 402, the micro-taggants may be applied to each of a plurality of agricultural products. Each of the micro-taggants may encode identifier information (e.g., source information, product type information) for each of the respective agricultural products. The identifier information may be a characteristic of the TruTag® micro-taggants that is detectable by a hyper-spectral imaging (HSI) taggant reader and which may be referenced in a database of the security system to determine the identifier information for the agricultural product to which particular micro-taggants have been applied.

In at least some implementations, the micro-taggants may be imperceptible to an unaided eye. Indeed, micro-taggants are classified as GRAS by the FDA and in some instances are utilized in pharmaceutical and nutraceutical industries for identification of materials.

In at least some implementations, the plurality of agricultural products may be sprayed with micro-taggants which are carried by at least one of compressed air or pressurized water (e.g., compressed ambient air, pressurized potable water). For example, the micro-taggants may be dispersed in water, and then the water including the taggants may be sprayed onto the agricultural products at least once during a vegetative growth cycle of the agricultural products. In other embodiments, the micro-taggant may be added to a derivative product, i.e. one that is post processed from the plant. Non-limiting examples include the flower, seed, stalk, leaves, oils, and other materials that are produced from a plant source. Further downstream processing may take these products and use them to make edible materials, processed materials for oral or topical use or materials for consumption, as non-limiting examples. Accordingly, the micro-taggant can be applied first to the plant when growing, then again, by a second unique processor in the down-stream process.

In at least some implementations, micro-taggants may be applied to each of the plurality of agricultural products multiple times (e.g., two times, three times, six times) throughout a vegetative growth cycle of each of the plurality of agricultural products. For example, micro-taggants may first be applied to each of the plurality of agricultural products prior to planting. Second, micro-taggants may be applied to each of the plurality of agricultural products when the agricultural products have reached approximately one half an expected vegetative size. Third, micro-taggants may be applied to each of the plurality of agricultural products when the agricultural products have fully matured (e.g., flowered). In at least some implementations, micro-taggants may be mixed with at least one of an added value agricultural product (e.g. oil, concentrate, edible, beverage).

At 404, the micro-taggants applied to agricultural products may be read by a hyper-spectral imaging (HSI) taggant reader or scanner. At 406, at least one processor of the security system may determine the identifier information for the at least one of the plurality of agricultural products based at least in part on the reading of the micro-taggants. For example, at least one processor of the security system may determine the source of an agricultural product based on the identifier information read or otherwise detected by a hyper-spectral imaging (HSI) taggant reader.

In operation, the micro-taggant based agricultural product tracking system may receive identifier information for a plurality of agricultural products from a plurality of hyper-spectral imaging (HSI) taggant readers operated by various entities (e.g., producers, processors, transporters, distributors, retailers, testing labs, regulating agencies, law enforcement agencies). Using such data, the at least one processor of the security system may track the plurality of agricultural products through a supply chain based at least in part on the received identifier information. Such information may be used by one or more entities associated with the agricultural industry including, but not limited to, producers, processors, transporters, distributors, retailers, consumers, regulators, law enforcement, etc.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other processor-based devices and/or displays associated with processor-based devices, for example touch-sensitive or touch-responsive displays of portable processor-based devices, not necessarily the exemplary processor-based devices generally described above.

For instance, the foregoing detailed description has set forth various implementations of the systems, devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via one or more processors, for instance one or more Application Specific Integrated Circuits (ASICs). However, those skilled in the art will recognize that the implementations disclosed herein, in whole or in part, can be equivalently implemented in standard or generic integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units (CPUs), graphical processing units (GPUs), programmable gate arrays (PGAs), programmed logic controllers (PLCs)), as firmware, or as virtually any combination thereof, and that designing the circuitry and/or writing the code for the software and or firmware would be well within the skill of one of ordinary skill in the art in light of the teachings of this disclosure. As used herein and in the claims, the terms processor or processors refer to hardware circuitry, for example ASICs, microprocessors, CPUs, GPUs, PGAs, PLCs, and other microcontrollers.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any hardware that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

Figure 5:
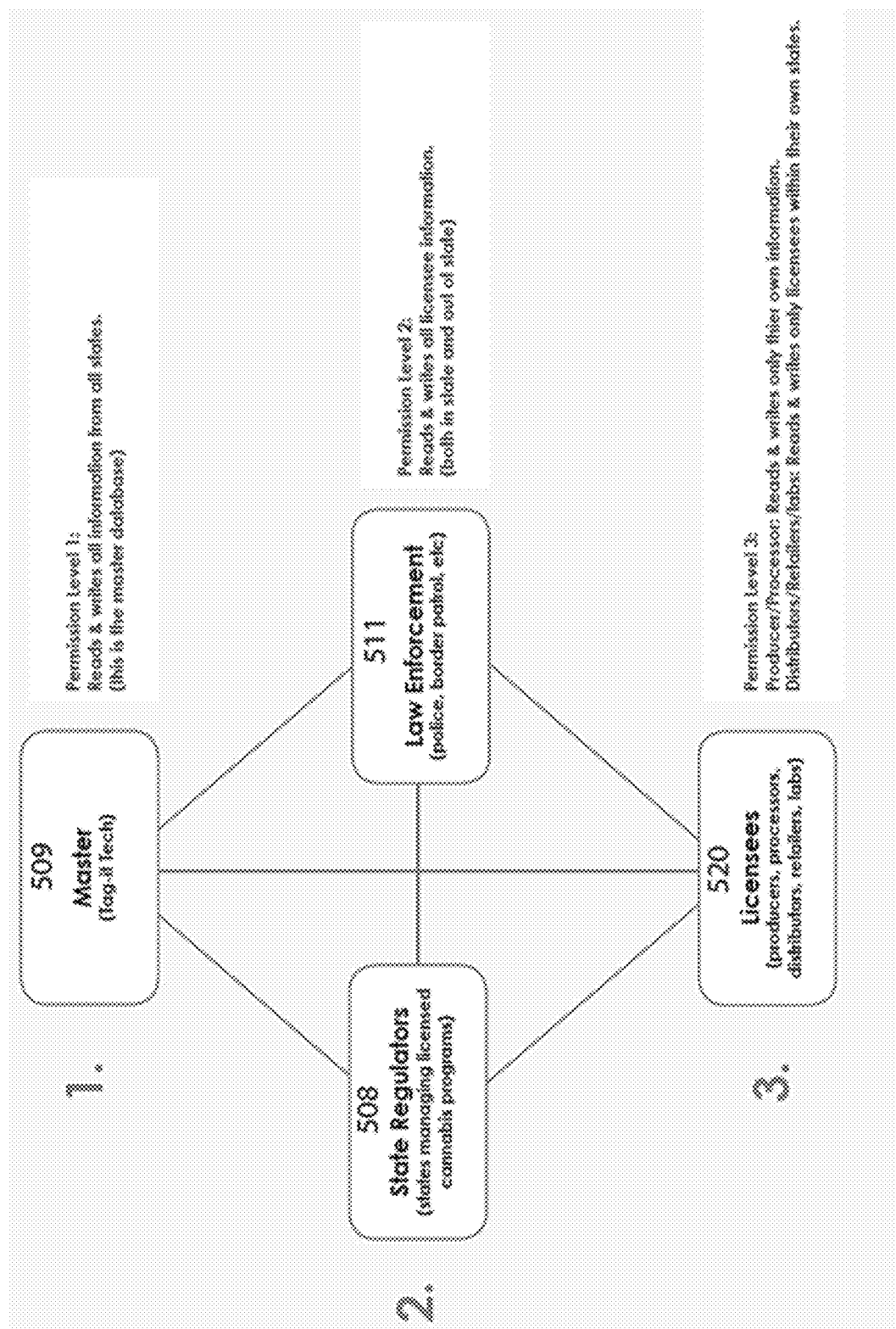
FIG. 5 is a block diagram identifying the multiple user groups serviced by the by the micro-taggant based agricultural product tracking system and a corresponding three level permission hierarchy, according to one illustrated implementation.

FIG. 5 shows the multiple user groups serviced by the Micro-Taggant Based Tracking Enterprise System (reference FIG. 1) and a corresponding three level permission hierarchy. Permission level 1: Reads and writes all information from all states. This is the master interface 509 controlling the Micro-Taggant Based Tracking Enterprise System (reference FIG. 1). The master interface is available only to the patent applicant or their licensed designee. Permission level 2 reads and writes all licensee information (from one or more states) for access by State regulating 508 agencies and law enforcement 511 agencies. Permission level 3 (licensees 520) reads and writes information from individual licensed producers and processors that is accessible only to those individual licensed producers and processors. Permission level 3 also reads and writes information from licensed producers and processors within a state that is accessible only to licensed distributors and retailers within that same state.

Figure 6:
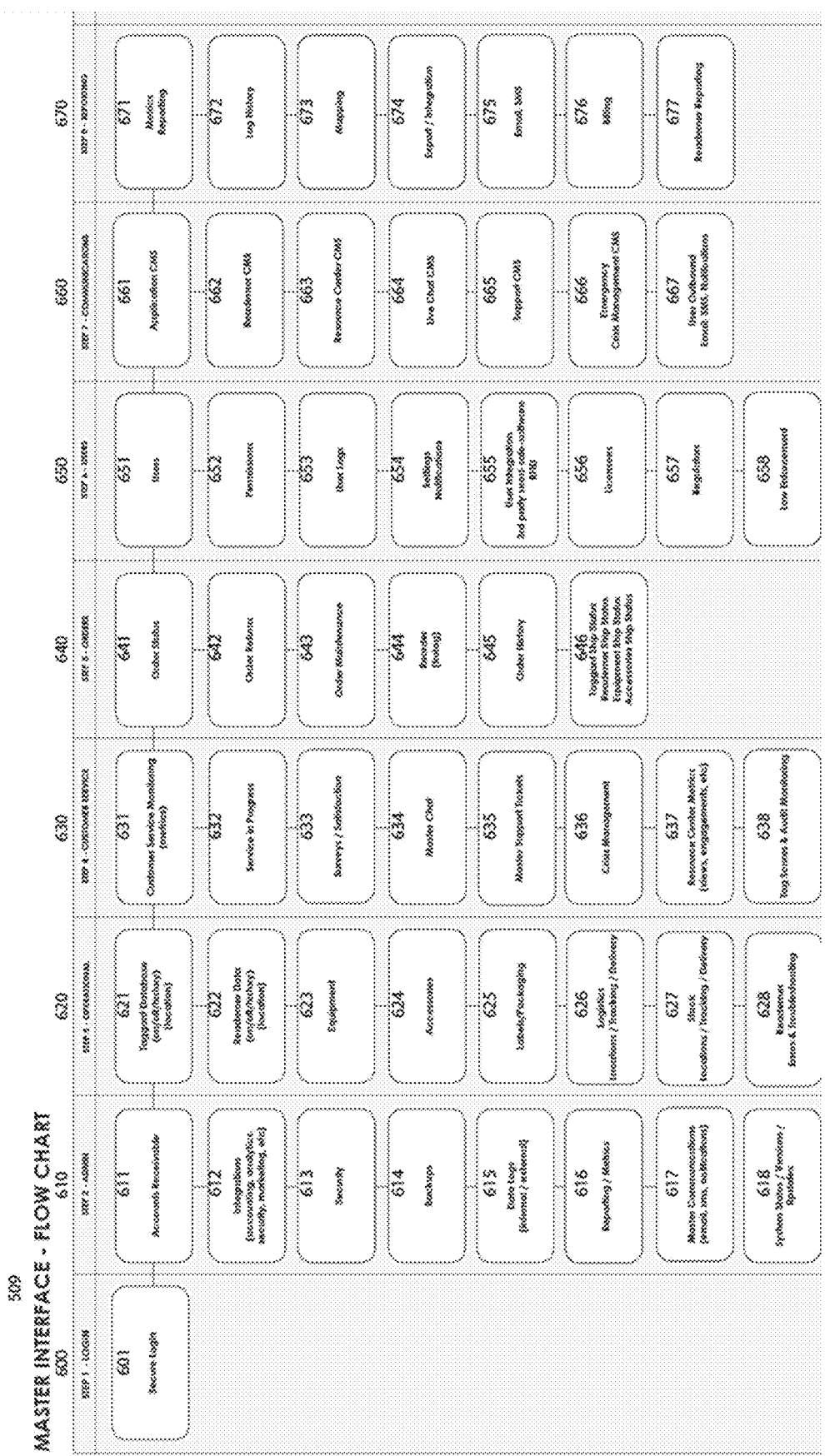
FIG. 6 shows a flow chart of the master interface for the micro-taggant based agricultural product tracking system (reference FIG. 1), according to one illustrated implementation.

FIG. 6 shows a flow chart of the master interface 509 for the micro-taggant based agricultural product tracking system (reference FIG. 1). The master interface 509 is accessible only by the master administrator and/or the super administrator responsible for the secure operation and maintenance of the Master Interface 509.

Column 600 includes at least one interface screen (601) that manages, displays and communicates data related to the secure logins.

Column 610 includes at least eight interface screens (611-618) that manage, display and communicate data related to all administrative settings.

Column 620 includes at least eight interface screens (621-628) that manage, display and communicate data related to all operational and logistics settings.

Column 630 includes at least eight interface screens (631-638) that manage, display and communicate data related to all customer service and resource management.

Column 640 includes at least six interface screens (641-646) that manage, display and communicate data related to the status of all orders for services and hardware from customer.

Column 650 includes at least eight interface screens (650-658) that manage, display and communicate data related to the management of users and permissions.

Column 660 includes at least seven interface screens (661-667) that manage, display and communicate data related to the management of communications and content management settings (CMS) used to control the organization of all the data.

Column 670 includes at least seven interface screens (671-677) that manage, display and communicate data related to the management of communications and content management settings (CMS) used to control the organization of reporting internal or customer data.

Figure 7:
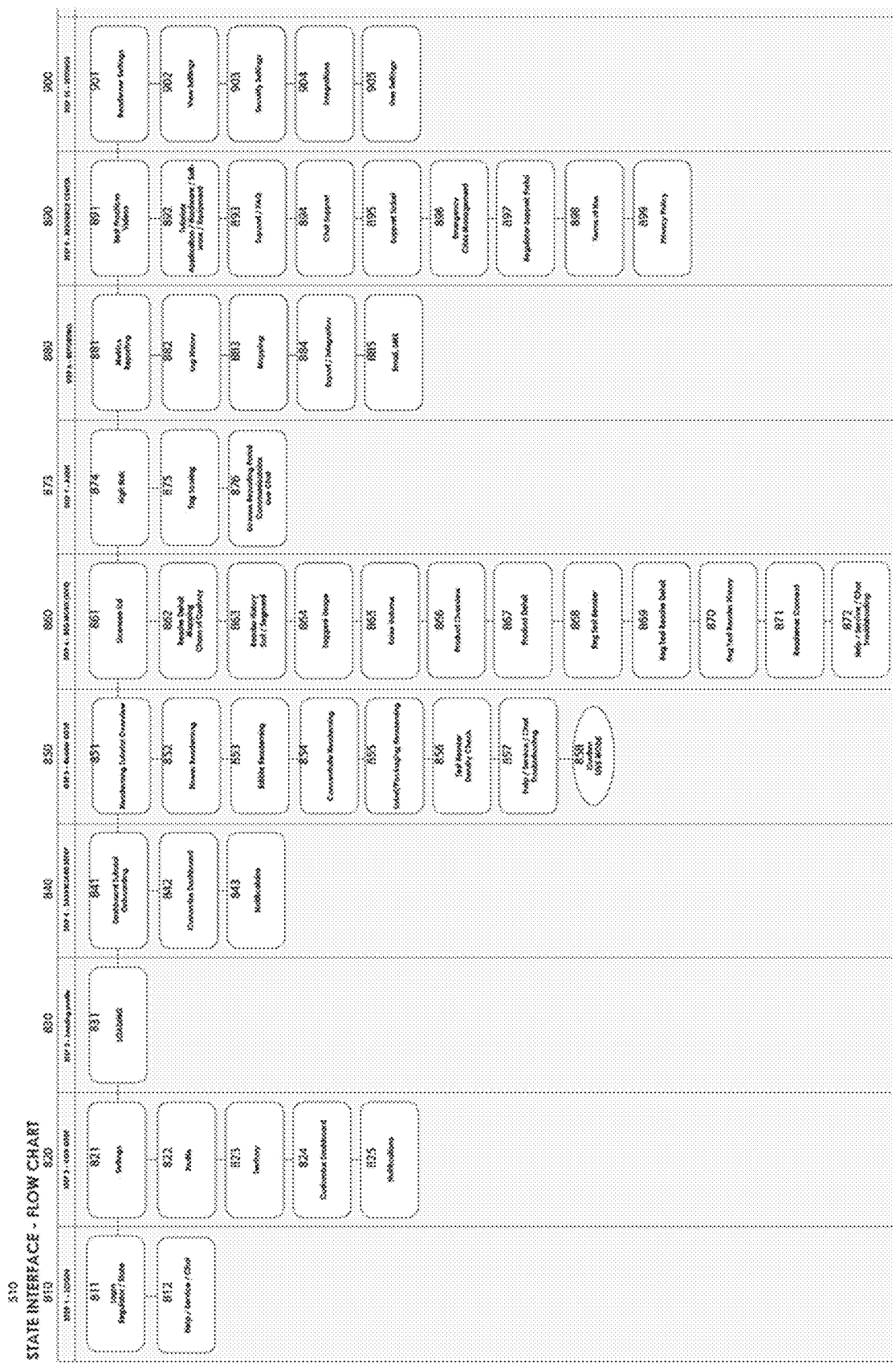
FIG. 7 shows a flow chart of a typical State Regulating Agency interfacing with the micro-taggant based agricultural product tracking system, according to one illustrated implementation.

FIG. 7 shows a flow chart of a typical state regulating agency 510 interfacing with the micro-taggant based agricultural product tracking system (reference FIG. 1). Individual state regulating agencies provide permissions and access to their interface on an internal/proprietary basis.

Column 810 includes at least five interface screens (811-812) that manage, display and communicate data related to state secure logins.

Column 820 includes at least eight interface screens (821-825) that manage, display and communicate data related to state user setup.

Column 830 includes at least one interface screen (831) that manages, displays and communicates data related to state loading profiles.

Column 840 includes at least three interface screens (641-643) that manage, display and communicate data related to the customized state dashboard setup.

Column 850 includes at least nine interface screens (651-658) that manage, display and communicate data related to the state regulator reader setup and TruTag® application density checks.

Column 860 includes at least twelve interface screens (861-872) that manage, display and communicate data related to state live regulation modes.

Column 873 includes at least three interface screens (874-876) that manage, display and communicate data related to licensee audits and performance scoring.

Column 880 includes at least five interface screens (881-885) that manage, display and communicate data related to licensee reporting.

Column 890 includes at least nine interface screens (891-899) that manage, display and communicate data related to state resource center.

Figure 8:
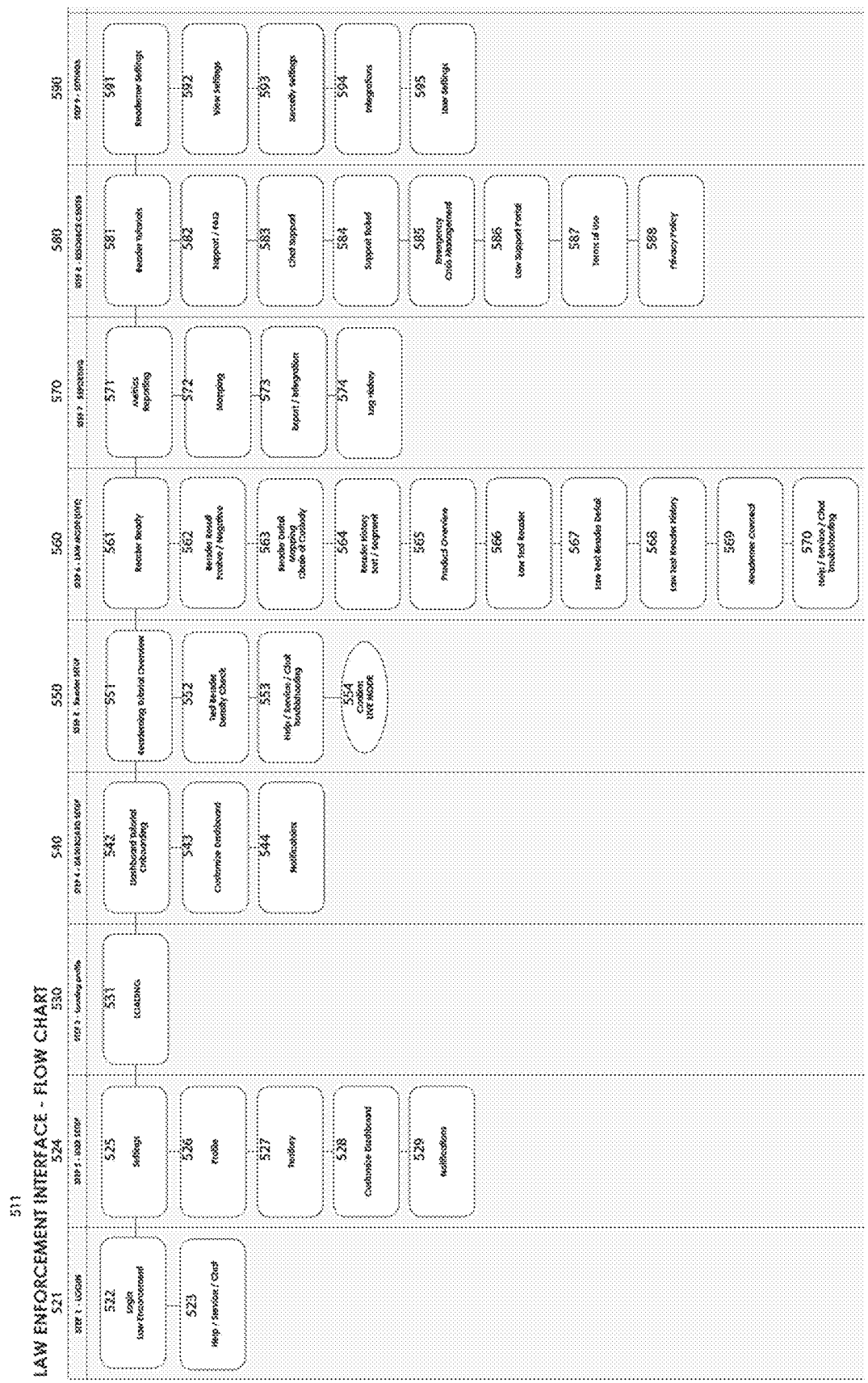
FIG. 8 shows a flow chart of a typical law enforcement agency interfacing with the micro-taggant based agricultural product tracking system, according to one illustrated implementation.

Column 900 includes at least five interface screens (901-905) that manage, display and communicate data related to state administrative settings FIG. 8 shows a flow chart of a typical law enforcement agency 511 interfacing with the micro-taggant based agricultural product tracking system (reference FIG. 1). Individual law enforcement agencies provide permissions and access to their interface on an internal/proprietary basis.

Column 521 includes at least two interface screens (522-523) that manage, display and communicate data related to Law Enforcement Agency secure logins.

Column 524 includes at least five interface screens (525-529) that manage, display and communicate data related to Law Enforcement Agency user setup.

Column 530 includes at least one interface screen (531) that manages, displays and communicates data related to Law Enforcement Agency loading profiles.

Column 540 includes at least three interface screens (542-544) that manage, display and communicate data related to the Law Enforcement Agency dashboard setup.

Column 550 includes at least four interface screens (551-554) that manage, display and communicate data related to Law Enforcement Agency reader setup.

Column 560 includes at least ten interface screens (561-570) that manage, display and communicate data related to live Law Enforcement Agency modes.

Column 570 includes at least three interface screens (571-574) that manage, display and communicate data related to Law Enforcement Agency reporting.

Column 580 includes at least eight interface screens (581-588) that manage, display and communicate data related to access Law Enforcement Agency resource center.

Column 590 includes at least five interface screens (591-595) that manage, display and communicate data related to Law Enforcement Agency settings.

Figure 9:
FIG. 9 shows a flow chart of a typical state licensee interfacing with the micro-taggant based agricultural product tracking system, according to one illustrated implementation.

FIG. 9 shows a flow chart of a typical state licensee 520 interfacing with the micro-taggant based agricultural product tracking system (reference FIG. 1). Individual licensees provide permissions and access to their interface on an internal basis and share that information with Sate agencies and Law Enforcement Agencies Column 700 includes at least one interface screen (701) that manages, displays and communicates data related to licensee registration.

Column 702 includes at least four interface screens (703-706) that manage, display and communicate data related to licensee search, verify and activate account.

Column 707 includes at least one interface screen (708) that manages, displays and communicates data related to loading licensee profiles.

Column 710 includes at least two interface screens (711-712) that manage, display and communicate data related to licensee details and production setup.

Column 713 includes at least six interface screens (714-719) that manage, display and communicate data related to licensee product orders and billing setup.

Column 720 includes at least two interface screens (721-722) that manage, display and communicate data related to licensee product shipment status and tracking.

Column 730 includes at least ten interface screens (731-740) that manage, display and communicate data related to licensee dashboard setup, taggant activation, reader activation, and equipment setup.

Column 741 includes at least seven interface screens (742-747) that manage, display and communicate data related to licensee TruTag® application setup.

Column 750 includes at least eight interface screens (751-758) that manage, display and communicate data related to licensee reader setup.

Column 760 includes at least six interface screens (761-766) that manage, display and communicate data related to licensee live internal mode.

Column 770 includes at least thirteen interface screens (771-783) that manage, display and communicate data related to licensee live external modes.

Column 784 includes at least six interface screens (785-790) that manage, display and communicate data related to licensee reporting.

Column 791 includes at least nine interface screens (792-800) that manage, display and communicate data related to licensee resource center.

Column 801 includes at least six interface screens (802-807) that manage, display and communicate data related to licensee settings.

In preferred embodiments, the various interfacing systems allow for detection and control of materials as they pass downstream from the original source. The micro-taggant can be utilized in all aspects to ensure that the materials are held in the proper chain of custody to ensure that the materials are not tampered with, and that appropriate fees, taxes, and licensing is provided in each situation.

For example, a plant based product, originating as cannabis, alcohol (grains), coffee, cacao, or tea (collectively "plant" in this example) is tracked using the micro-taggant as described herein. When the plant is growing, a micro-taggant as described herein, is applied to the plant. Preferably, the micro-taggant is applied when the plant is in one of the following stages: first true leaves, before first flower buds, while flowering, after flowering, before setting seeds, after setting seeds, before harvest, or after harvest. In each case, the micro-taggant can be applied via the methods and carriers as described herein, preferably through a carrier and applied via compressed or blown ambient air or via water to be sprayed or applied to the plant.

Once the materials are tagged, they can be scanned into the system and data about materials, for example, plant date, seeding date, harvest date, can be processed, stored and analyzed. Furthermore, the unique ID allows the grower to be identified. Additional information may then include aspects such as intended target or receiver, intended use of the materials, or timing for use.

After transportation of the materials and arrival at a second custodian, the harvest materials can be scanned to confirm receipt, and a new micro-taggant applied. This new micro-taggant can relate to the next in line handler of the materials. This again confirms the chain of custody. Indeed, a transporter may have an intervening taggant, in certain embodiments.

When the harvested materials are provided to a processor, the prior taggants may, in some cases be eliminated from the materials. For example, if the materials are seeds and they are processed into oil, some or all of the growing tag may be eliminated. The processor of the oil can then apply their own unique micro-taggant to the processed oil before it leaves their custody.

A further user may then process the oil into a material suitable for consumption, for example taking the oil and creating a food based product comprising the oil. The confectioner (baker or creator of the food based product), may have her own micro-taggant to apply to a finished product.

Along the chain of custody, at a minimum, the grower would have applied a micro-taggant. It would be scanned before leaving and, in preferred embodiments, scanned upon arrival, thus confirming the goods. A new micro-taggant is applied by the next custodian and scanned. This creates a log of the records and unique ID corresponding to each custodian. As the material leaves the second custodian, it would again, in certain embodiments be scanned and the record updated before transportation or arrival to a third custodian. Again, optional scanning upon arrival and then application of a third taggant for the third custodian.

Each step confirms the source and identity of the goods. Each source can then be utilized to confirm proper chain of custody, to ensure the goods are genuine.

In certain embodiments, payment of required taxes, fees, or other monies can be tracked with the production of the goods. In this way, addition of a micro-taggant confirms the existence of the goods and also provides evidence of payment of these taxes, fees, or other monies.

For goods that enter the consumer marketplace, and as provided through the FIGS. 5-9, different providers have different levels of permission to review the history of the tagged goods. In one example, e.g. FIG. 8, law enforcement would be able to scan a product, be it an edible material, a beverage, a rolled cigarette, or loose plant materials, and scan the material to confirm status. Where no tag is found, a presumption can be applied that the goods are black market products that are outside of state or federal licensing and tax programs. Where a tag is found, confirmation of the goods can be corroborated to ensure the materials have entered the stream of commerce that they were intended when produced. This serves as a powerful tool to confirm the quality and source of goods and to confirm that proper taxes are paid to the state and federal governments that regulate the sale of certain products.

Therefore, methods herein, provide for a method of tracking and confirming the payment of state, local, or federal taxes on a good, comprising applying a micro-taggant to a good, a first scanning of the goods, making a tax payment on the goods, and entering the confirmation of taxes to a database corresponding to the micro-taggant; Performing a second scanning the goods at a time after the first scanning of the goods and confirming the entry of a payment of state, local, or federal taxes on the goods.

A preferred embodiment comprises the system as described herein, comprising a first, and a second micro-taggant, wherein the first and second micro-taggant each have a different optical signature; an optical reader, capable of detecting either the first or second micro-taggant; a software enterprise providing different levels of access to the enterprise, based upon the necessary access for a user;

wherein a first micro-taggant may have a different access level or permission than the second micro-taggant. In particular embodiments, higher level access means that a user can track and see multiple levels of micro-taggant that have been, at one time, attached to a product in commerce. For example a first level might be a grower, a second level might be a law-enforcement arm.

In preferred embodiments, the system further comprises a third micro-taggant, wherein the third micro-taggant has a different optical signature from the first and second micro-taggant; wherein access to view the micro-taggants corresponding to a product depends on the access level granted to a user.

In certain embodiments, it may be suitable for a law enforcement office to identify that goods are misplaced. A warrant, if granted, could then be used to perform a complete search, including all levels of permission to identify and track the goods, if the law enforcement did not previously have access to all levels.

In preferred embodiments, the micro-taggant is applied to a growing plant, and the micro-taggant functions as both a tag and as a fertilizer component. Thus, a method of applying a micro-taggant comprises administering a micro-taggant, having a unique optical fingerprint to a growing plant, wherein the micro-taggant that does not adhere to the plant is allowed to collect in the soil and serve as a fertilizer.

A method of tracking a cannabis product comprising: applying a first micro-taggant to a growing cannabis plant, said first micro-taggant comprising a unique optical signature; harvesting the cannabis plant; scanning the harvested cannabis plant and identifying the harvested cannabis by the optical signature of the first micro-taggant; transporting the harvested cannabis and applying a second micro-taggant to said harvested cannabis, wherein said second micro-taggant comprises a different optical signature than the first micro-taggant; scanning the second micro-taggant and confirming the presence of the second micro-taggant.

In preferred embodiments, scanning the first or second micro-taggant automatically updates a database system with the information regarding the cannabis, such as time, date, and location. In further preferred embodiments, each time a micro-taggant is scanned, the database system is updated.

In preferred embodiments, a method of tracking cannabis from field to an edible product, comprising: applying a micro-taggant to a growing cannabis plant; scanning the micro-taggant and updating the database with information on said scan; harvest and process the cannabis; applying a second-micro taggant to the harvested cannabis and scanning the second micro-taggant; processing the harvested cannabis, wherein the processing removes at least a portion of the second-micro taggant from the cannabis; applying a third micro-taggant to the processed cannabis.

What is claimed is:

1. A method of operating a micro-taggant based agricultural product tracking system to identify agricultural products, the method comprising: applying a silicon dioxide (silica) material encoded with an optical signature (micro-taggants) to each of a plurality of agricultural products, each of the micro-taggants encoding identifier information for each of the respective agricultural products; reading, via a hyper-spectral imaging (HSI) taggant reader, the micro-taggants applied to at least one of the plurality of agricultural products; and determining, via at least one processor, the identifier information for the at least one of the plurality of agricultural products based at least in part on the reading of the micro-taggants.

2. The method of claim 1 wherein applying micro-taggants to each of a plurality of agricultural products comprises applying micro-taggants to each of a plurality of agricultural products, the agricultural products comprising at least one of: cannabis, alcohol, coffee, cacao, tea, or product packaging.

3. The method of claim 1 wherein applying micro-taggants to each of a plurality of agricultural products comprises applying micro-taggants to each of a plurality of agricultural products, the agricultural products comprising at least one of a high-value crop, a derivative of a high-value crop, a government regulated crop, a derivative of a government regulated crop, or product packaging.

4. The method of claim 1, further comprising: receiving, via at least one processor, identifier information for the plurality of agricultural products from a plurality of hyper-spectral imaging (HSI) taggant readers; and tracking, via the at least one processor, the plurality of agricultural products through a supply chain based at least in part on the received identifier information.

5. The method of claim 1 wherein applying micro-taggants to each of a plurality of agricultural products comprises applying micro-taggants onto or mixing micro-taggants into the plurality of agricultural products, wherein the micro-taggants are carried by at least one of compressed ambient air or pressurized potable water.

6. The method of claim 5 wherein applying micro-taggants to each of a plurality of agricultural products comprises applying micro-taggants onto or mixing micro-taggants into the plurality of agricultural products, wherein the micro-taggants are carried by a soluble organic agent.

7. The method of claim 1 wherein applying micro-taggants to each of a plurality of agricultural products comprises applying micro-taggants onto or mixing micro-taggants into crop derived products or product packaging.

8. The method of claim 1 wherein applying micro-taggants to each of a plurality of agricultural products comprises applying micro-taggants to each of the plurality of agricultural products multiple times throughout a vegetative growth cycle of each of the plurality of agricultural products.

9. The method of claim 1 wherein applying micro-taggants to each of a plurality of agricultural products comprises applying micro-taggants to each of the plurality of agricultural products during processing of the plurality of agricultural products.

10. The method of claim 1 wherein applying micro-taggants to each of a plurality of agricultural products comprises: dispersing the micro-taggants in a soluble organic agent; and spraying the soluble agent including the micro-taggants onto the agricultural products at least once during a vegetative growth cycle of the agricultural products.

11. The method of claim 1 wherein applying micro-taggants to each of a plurality of agricultural products comprises: first applying micro-taggants to each of the plurality of agricultural products prior to planting; second applying micro-taggants to each of the plurality of agricultural products when the agricultural products have reached juvenile state; and third applying micro-taggants to each of the plurality of agricultural products when the agricultural products have reached mature state.

12. The method of claim 1 wherein applying micro-taggants to each of a plurality of agricultural products comprises mixing the micro-taggants with at least one of an oil, a crop derivative, concentrate, edible, beverage or other added value agricultural product.

13. The method of claim 1 wherein applying micro-taggants to each of a plurality of agricultural products comprising applying micro-taggants that are unidentifiable to an unaided eye.

14. The method of claim 1 wherein applying micro-taggants to each of a plurality of agricultural products comprises applying micro-taggants to each of a plurality of agricultural products, and each of the micro-taggants encodes identifier information for each of the respective agricultural products which identifies tracking information of the respective agricultural products.

15. The method of claim 1 wherein applying micro-taggants to each of a plurality of agricultural products comprises applying micro-taggants to each of a plurality of cannabis products, and the plurality of cannabis products comprises at least one of seeds, flowers, oils, concentrates, edibles, infusions, distillates, fermentations, or product packaging.

16. The method of claim 1 wherein applying micro-taggants to each of a plurality of agricultural products comprises applying micro-taggants to each of a plurality of agricultural products, and the micro-taggants are constructed of materials that do not burn, oxidize or otherwise degrade upon combustion.

17. The method of claim 1 wherein applying micro-taggants to each of a plurality of agricultural products comprises applying micro-taggants to each of a plurality of agricultural products, and the micro-taggants are constructed of non-toxic and inert materials that do not react with agricultural compounds when mixed with oils, concentrates, solvents, dilutions, dispersions and suspensions.

18. A security system to identify agricultural products, the security system comprising: a plurality of micro-taggants applied to each of a plurality of agricultural products, each of the micro-taggants encoding identifier information for each of the respective agricultural products; at least one hyper-spectral imaging (HSI) taggant reader operable for reading the micro-taggants applied to the at least one of the plurality of agricultural products; at least one nontransitory processor-readable storage medium that stores at least one of processor-executable instructions or data; and at least one processor communicably coupled to the at least one non-transitory processor-readable storage medium, in operation the at least one processor: determines the identifier information for the at least one of the plurality of agricultural products based at least in part on the reading of the micro-taggants by the at least one hyper-spectral imaging (HSI) taggant reader.

19. The micro-taggant based agricultural product tracking system of claim 18 further comprising a plurality of a second micro-taggants, said second micro-taggants having a different identifier information than the first micro-taggant.

20. The system of claim 19, wherein the micro-taggants and the second micro-taggants each have different access controls enabled for viewing or tracking the status of the agricultural product.

21. The micro-taggant based agricultural product tracking system of claim 18 wherein the agricultural products comprise at least one of: cannabis, alcohol, coffee, cacao, tea, or product packaging.

22. The micro-taggant based agricultural product tracking system of claim 18 wherein the agricultural products comprise at least one of a high-value crop, a derivative of a high-value crop, a government regulated crop, or a derivative of a government regulated crop.

23. The micro-taggant based agricultural product tracking system of claim 18 wherein the at least one processor: receives identifier information for the plurality of agricultural products from a plurality of hyper-spectral imaging (HSI) taggant readers; and tracks the plurality of agricultural products through a supply chain based at least in part on the received identifier information.

24. The security system of claim 18 wherein the micro-taggants are unidentifiable to an unaided eye.

25. The security system of claim 18 wherein each of the micro-taggants encodes identifier information for each of the respective agricultural products which identifies tracking information of the respective agricultural products.

26. The micro-taggant based agricultural product tracking system of claim 18 wherein the plurality of agricultural products comprises at least one of seeds, flowers, oils, concentrates, edibles, infusions, distillates, fermentations, or product packaging.

27. The micro-taggant based agricultural product tracking system of claim 18 wherein the micro-taggants are constructed of materials that do not burn, oxidize or otherwise degrade upon combustion.

28. The micro-taggant based agricultural product tracking system of claim 18 wherein the micro-taggants are constructed of non-toxic and inert materials that do not react with compounds when mixed with oils, concentrates, solvents, dilutions, dispersions and suspensions.

29. The system of claim 18, wherein the micro-taggant is generally recognized as safe for consumption.

30. The system of claim 18, wherein the micro-taggant can be utilized as a fertilizer when applied to the agricultural product.

* * * * *